March 21, 1967  F. L. TORNEY, JR  3,310,699
ULTRAHIGH VACUUM GAUGE HAVING TWO COLLECTOR ELECTRODES
Filed Oct. 16, 1964

United States Patent Office 3,310,699
Patented Mar. 21, 1967

3,310,699
ULTRAHIGH VACUUM GAUGE HAVING TWO
COLLECTOR ELECTRODES
Franklin L. Torney, Jr., South Weymouth, Mass., assignor to National Research Corporation, Cambridge, Mass., a corporation of Massachusetts
Filed Oct. 16, 1964, Ser. No. 404,212
1 Claim. (Cl. 313—7)

The present invention relates to vacuum gauges and particularly to the measurement of ultra high vacuum. The invention described herein was made in the performance of work under a NASA contract and is subject to the provisions of the National Aeronautics and Space Act of 1958, Public Law 85-568 (72 Stat. 426; 42 U.S.C. 2451) as amended. A license has been granted to the United States Government for practice of the invention and title to the invention and this patent have been reversed to the assignee, subject to voidability by NASA.

It is known that the calibration of vacuum gauges, particularly hot filament ionization gauges without magnets, departs from linear in the ultra high vacuum range. The collection current is much higher than the current corresponding to the pressure to be measured.

It is therefore the object of this invention to provide a technique of pressure measurement which allows the nonlinear gauge readings in the ultra high vacuum range to be corrected to true pressure with greater accuracy.

It is a further and related object to provide an improved gauge construction which makes possible the practice of this technique.

Other objects of the invention will in part be obvious and will in part appear hereinafter.

The invention accordingly comprises an improved gauge and an improved technique of measuring ultra high vacuum pressures.

Figure 1:
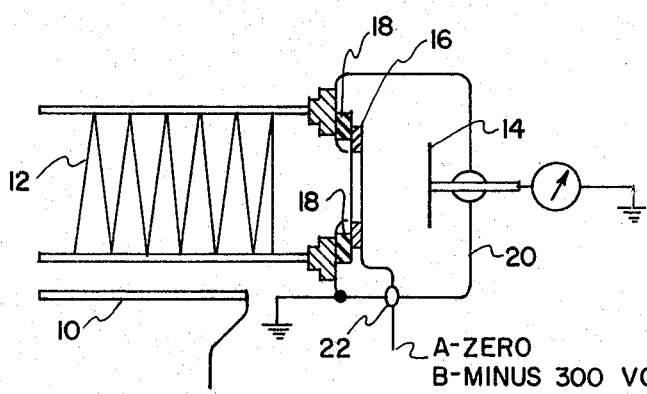
Figure 2:
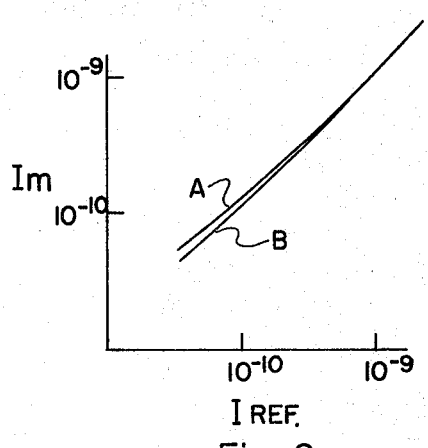
Figure 3:
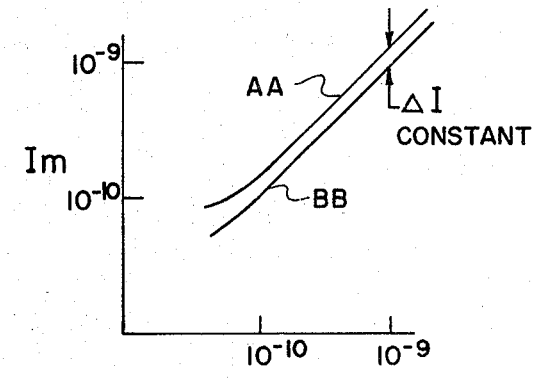
Figure 5:
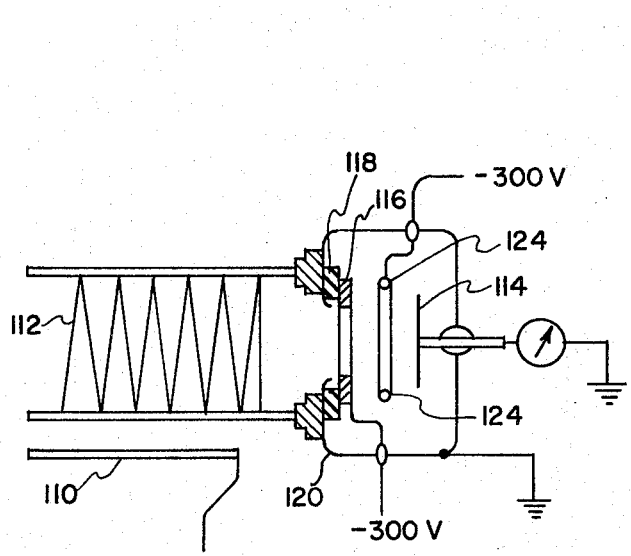
Figure 4:
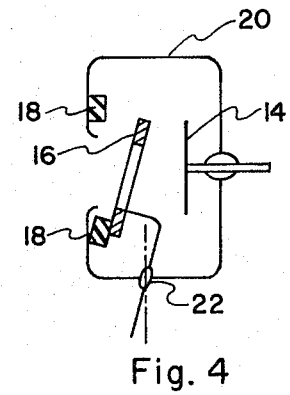

For a fuller understanding of the nature and objects of the invention, reference should be had to the following explanation, taken in connection with the accompanying drawings wherein:

FIG. 1 is a schematic drawing of a prior art suppressor gauge utilized by applicant in making the present invention;

FIG. 2 indicates the calibration curve usually associated with the gauge of FIG. 1;

FIG. 3 indicates an anomalous calibration curve obtained by a variant construction of the gauge of FIG. 1, which variant is schematically shown in FIG. 4;

FIG. 5 shows an improved gauge according to a preferred embodiment of the invention.

It will be useful in explaining the gauge to explain the fortuitous manner in which the invention was discovered. Experiments were being conducted to determine the calibration of a suppressor gauge. Reference is made to the article by Schuemann at pages 428–430 of the Transactions of the 1962 Vacuum Symposium (American Vacuum Society and McMillan Co., New York, 1962) for a further discussion of the gauge, per se. A modified version of the gauge was made as shown in FIG. 1 wherein a filament 10 emits electrons which are accelerated towards an anode grid 12. The entire structure is in a glass tube (not shown) evacuated to the ultra high vacuum range. The electrons ionize residual gas molecules which are collected at a collector electrode 14. This ion current is a measure of the residual pressure. A suppressor ring 16 prevents secondary emission of electrons from the collector due to X-rays from the anode grid. The suppressor ring is mounted on spaced ceramic insulators 18 in a shield box 20 which protects the suppressor ring from X-rays and electrons. An insulator 22 supports an electrical lead for biasing the suppressor negative with respect to the collector.

The experiments were conducted by comparing the measured collector current ($Im$) of the suppressor gauge with the collector current ($Iref$) of a modulated Bayard-Alpert type gauge after Redhead (Review of Scientific Instruments, vol. 31: pp. 343–344, 1960). It was expected that the calibration curve would be as shown in FIG. 2. That is, operating without the secondary emission suppression (suppressor voltage zero; curve A), the collector current would depart from linear in the range of $10^{-10}$ amperes reference current as X-ray effects became significant compared to ion current. Operating with the suppressor ring at minus 300 volts, the departure from linear would be attenuated (curve B).

Instead, the anomalous results of FIG. 3 were encountered. The curve AA produced without suppression was similar to the expected curve A of FIG. 2. The curve BB, produced with suppression, was lower than AA in the range where X-ray effects are not significant. The difference in collector currents between curves AA and BB was essentially constant down to the middle of the $10^{-10}$ reference current range. Then both curves departed from linear at different rates.

Later the gauge was disassembled and it was observed that the suppressor ring was tilted away from its intended position as shown in FIG. 4.

It is concluded that, due to the inadvertent tilting, and its negative potential, the suppressor ring 16 intercepted a portion of the ions destined for the collector 14, in a manner analogous to the operation of a modulated Bayard-Alpert gauge, thus producing the lower calibration curve BB. It must be that a uniform percentage of ions are collected since the difference (about 10%) between curves AA and BB is constant in the high vacuum range. A modulator can be provided in a suppressor gauge, either as part of the suppressor as in the fortuitous configuration above, or as a separate element. The discovery that the modulation fraction is constant allows one to use suppression and modulation functions together to provide more accurate readings of ultra high vacuum pressures than would be obtainable from the use of a suppressor gauge, a modulation gauge, or both operated simultaneously.

A preferred embodiment of the invention is shown in FIG. 5. The gauge elements are essentially the same as in FIG. 1 (including filament 110, anode grid 112, collector 114, suppressor 116 mounted via ceramic spaces 118 to a shield box 120 corresponding to the elements 10, 12, 14, 16, 18, 20 of FIG. 1 respectively), except that a modulator ring 124 is added, as shown in FIG. 5. The modulator ring 124 may be maintained at a potential of about $-100$ to $-300$ volts in typical configurations when in use for intercepting a portion of the ions, and at ground potential when not in use. The suppressor ring 116 can operate at about $-300$ volts and ground. The modulator ring 124 is located in a zone within the shield box 120 well shielded from radiation emanating from the anode grid 112.

Before describing the best mode of using the invention, the nature of the interelectrode currents in an ionization gauge is restated in simple fashion. The total current measured at the collector ($Im$) is due to positive ions and secondary emission of electrons $I_N$. The positive ion current is made up of positive ions formed from molecules of the gas to be studied ($Is$), highly energetic ions of gas (oxygen and other contaminant gases) sorbed in the anode grid and other gauge elements and desorbed by operation of the gauge ($I_H$) and low energy ions ($Ic$) formed by the ionization of neutral molecules of contaminant gas. The contaminant gas is any gas in the tube whose partial pressure has no relation to the partial pressures of gas under study.

The total collector current in a gauge (no modulation, no suppression), may then be described as follows:

$$Im = (Is + Ic) + (I_N + I_H) \qquad (1)$$

If the gauge is modulated, without suppression, Equation 1 must be revised as follows:

$$Im_2 = \alpha(Is + Ic) + (I_N + I_H) \qquad (2)$$

where $\alpha$ is the constant of modulation which can be determined. The collector current of a suppressor gauge (no modulation) is:

$$Im_3 = Is + Ic + I_H, \quad I_N = 0 \qquad (3)$$

The operation of the suppressor grid reduces secondary emission to zero.

Subtracting Equation 3 from Equation 1:

$$Im - Im_3 = I_N \qquad (4)$$

That is, the difference between the gauge readings with and without suppression gives the true secondary emission current of the gauge.

Further information can be developed from the readings $Im$, $Im_2$, $Im_3$, and follows:

Equation 1 is multiplied by $\alpha$:

$$\alpha Im = \alpha(Is = Ic) + \alpha(I_N + I_H) \qquad (1')$$

Subtracting Equation 2 from Equation 1'

$$I_H = \frac{\alpha Im - Im_2}{\alpha - 1} = I_N \qquad (5)$$

Since $I_N$ and $\alpha$ can be determined for a gauge, one can solve for $I_H$.

It has been proposed by Redhead (see e.g., Vacuum Magazine, vol. 13, p. 253, 1963) that the ratio $Ic:I_H$ is about 100. Experimental data indicates that this figure is correct. Therefore, once the reading, $Im$, $Im_2$ and $Im_3$ have been made and $\alpha$ is determined for a gauge, one can compute $Ic$, $I_N$, $I_H$ as noted above. Then, returning to Equation 1 above, $Is$, which is the measure of gas density, can be computed.

The above finding that the deviation in collector current due to inadvertent modulation is constant leads to the conclusion that the factors $I_H$ and $Ic$ are independent of pressure. This allows the present invention to be used in the following manner. Operating at known pressures in the range of $10^{-9}$ torr based on a reference current of a gauge having a sensitivity of 0.1 amp./torr, the gauge of FIG. 5 is operated with modulation and without modulation. The uniform difference between curves $$(Im - Im_3)$$

gives the current $I_N$. Then, at lower pressures, the gauge is operated with suppression to eliminate $I_N$. The measured collector current at lower pressures $(Im_2)$ will be utilized in Equations 2 and 5 with a known value of $I_N$, to find $I_H$. $Ic$ is then determined as $100 I_H$. Equation 1 can then be utilized to find the ionization current $(Is)$ related to the gas under study. Thus, a pressure gauge with suppressor and modulator, constructed as described above, affords advantages beyond those attainable by measuring gas density with a suppressor gauge and a modulator gauge together.

Many variations can be made from the preferred embodiment of the above description. It is therefore intended that the above description shall be regarded as illustrative and not in a limiting sense.

What is claimed is:

An improved ultra high vacuum gauge comprising in combination means for ionizing molecules of the gas whose pressure is to be measured, a first collector electrode for collecting ions, means for suppressing secondary emission from the first collector electrode, means for shielding the suppressing means from radiation from the ionizing means, and a second collector means interposed between said first collector and said suppressor and biassed negatively with respect to said first collector, said second collector arranged to selectively collect ions and reduce ion flow to said first collector.

References Cited by the Examiner

UNITED STATES PATENTS

| | | | |
|---|---|---|---|
| 2,639,397 | 5/1953 | Clark | 313—7 |
| 3,001,128 | 9/1961 | Nottingham | 315—111 X |

JAMES W. LAWRENCE, *Primary Examiner.*

GEORGE N. WESTBY, S. SCHLOSSER,
*Assistant Examiners.*